United States Patent
Kuribara

(10) Patent No.: US 10,553,033 B2
(45) Date of Patent: *Feb. 4, 2020

(54) HEAD-MOUNTED DISPLAY SYSTEM AND METHOD FOR PRESENTING DISPLAY ON HEAD-MOUNTED DISPLAY

(71) Applicant: COLOPL, INC., Tokyo (JP)

(72) Inventor: Hideyuki Kuribara, Tokyo (JP)

(73) Assignee: COLOPL, INC., Tokyo (JP)

( * ) Notice: Subject to any disclaimer, the term of this patent is extended or adjusted under 35 U.S.C. 154(b) by 11 days.

This patent is subject to a terminal disclaimer.

(21) Appl. No.: 15/910,585

(22) Filed: Mar. 2, 2018

(65) Prior Publication Data

US 2018/0190039 A1 Jul. 5, 2018

Related U.S. Application Data

(63) Continuation of application No. 15/334,271, filed on Oct. 25, 2016, now Pat. No. 9,940,754, which is a
(Continued)

(30) Foreign Application Priority Data

Dec. 15, 2014 (JP) .................................. 2014-252963

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ........ G06T 19/006; G06F 3/011; G06F 3/012; G06F 3/0346; G06F 3/0482; G02B 27/017; G02B 2027/0187

See application file for complete search history.

(56) References Cited

U.S. PATENT DOCUMENTS 9,442,631 B1    9/2016  Patel et al.
9,940,754 B2 *  4/2018  Kuribara ................. G06F 3/012
                        (Continued)

FOREIGN PATENT DOCUMENTS

JP      7-261112 A    10/1995
JP      8-223658 A     8/1996
                    (Continued)

OTHER PUBLICATIONS

Office Action in JP Application No. 2014-252963, dated Apr. 17, 2015, 8pp.
(Continued)

*Primary Examiner* — Jeffery A Brier
(74) *Attorney, Agent, or Firm* — Hauptman Ham, LLP

(57) ABSTRACT

A head-mounted display system includes an inclination detector for detecting an inclination of a head-mounted display. The head-mounted display system further includes a display controller for generating an application image in accordance with the detected inclination for display on the head-mounted display. The display controller is configured to superimpose a menu image on the application image for display on the head-mounted display in response to a determination that the detected inclination exceeding a first threshold value.

19 Claims, 5 Drawing Sheets

Related U.S. Application Data continuation of application No. PCT/JP2015/084744, filed on Dec. 11, 2015.

(51) Int. Cl.
  *G06F 3/01* (2006.01)
  *G06F 3/0482* (2013.01)
  *G06F 3/0346* (2013.01)

(52) U.S. Cl.
  CPC ............ *G06F 3/012* (2013.01); *G06F 3/0346* (2013.01); *G06F 3/0482* (2013.01); *G02B 2027/0187* (2013.01)

(56) References Cited

U.S. PATENT DOCUMENTS

| | | |
|---|---|---|
| 2005/0248852 A1 | 11/2005 | Yamasaki |
| 2012/0236025 A1 | 9/2012 | Jacobsen et al. |
| 2013/0135353 A1 | 5/2013 | Wheeler et al. |
| 2013/0246967 A1 | 9/2013 | Wheeler et al. |
| 2015/0009132 A1 | 1/2015 | Kuriya et al. |
| 2015/0153571 A1 | 6/2015 | Ballard et al. |
| 2015/0213778 A1 | 7/2015 | Moravetz |
| 2016/0054791 A1 | 2/2016 | Mullins et al. |
| 2016/0291930 A1 | 10/2016 | Isherwood |
| 2017/0053443 A1 | 2/2017 | Diament et al. |
| 2017/0092002 A1 | 3/2017 | Mullins et al. |

FOREIGN PATENT DOCUMENTS

| | | |
|---|---|---|
| JP | 11-161190 A | 6/1999 |
| JP | 2005-348382 A | 12/2005 |
| JP | 2010-97472 A | 4/2010 |
| JP | 2013-258614 A | 12/2013 |

OTHER PUBLICATIONS

International Search Report in PCT/JP2015-084744, dated Feb. 16, 2016, 3pp.

Moravetz, U.S. Appl. No. 61/931,583, filed Jan. 25, 2014, specification, claims, abstract and drawings, 19pp.

* cited by examiner

HEAD-MOUNTED DISPLAY SYSTEM AND METHOD FOR PRESENTING DISPLAY ON HEAD-MOUNTED DISPLAY

CROSS REFERENCE TO RELATED PATENT APPLICATIONS

The present application is continuation of U.S. patent application Ser. No. 15/334,271, filed Oct. 25, 2016, which is a continuation application of International Application No. PCT/JP2015/084744, filed Dec. 11, 2015, which claims priority to Japanese Patent Application No. 2014-252963, filed Dec. 15, 2014. The contents of these applications are incorporated herein by reference in their entirety.

BACKGROUND

Field

The present disclosure relates to displaying an image in a virtual space, and more particularly relates to a head-mounted display system to be mounted on the head of a user for displaying an image in a virtual space in a user's visual field in which displaying or hiding a menu on the image can be operated with a simple operation of moving the head, a method for presenting display on a head-mounted display, and a non-transitory computer-readable data recording medium storing a program.

Description of the Related Art

A head-mounted display (hereinafter referred to as HMD) to be mounted on the head of a user and capable of presenting an image in a virtual space to the user on a display or the like located before his/her eyes is known. Conventionally, switching between displaying and hiding a menu while an application is in progress in the HMD has been performed by a button operation by a controller connected to the HMD, for example.

SUMMARY

A head-mounted display system according to an embodiment includes an inclination detector for detecting an inclination from an initial angle of a head-mounted display mounted on a user while an application is in progress, and a display controller for generating an application image in progress in the virtual space in accordance with the detected inclination and outputting the application image to the head-mounted display. When the detected inclination is larger than a first threshold value, the display controller generates an image in which a menu image is superimposed on the application image generated in accordance with the inclination and outputs the generated image to the head-mounted display. When the menu image is output to the head-mounted display, and when an angular displacement from the first threshold value is negative and the absolute value of the angular displacement is larger than a second threshold value, the display controller generates an application image in which the menu image is not superimposed on the virtual space in accordance with the inclination and outputs the generated application image to the head-mounted display.

In an aspect, a user being immersed in a virtual space can perform a predetermined operation of an application in a virtual space, for example, an operation of displaying or hiding a menu, by a movement of his/her head. It is not necessary for the user being immersed in the virtual space to make an inconvenient adjustment with his/her eyeballs for observing the menu in the virtual space, which results in favorable operability.

When the detected inclination is larger than the first threshold value, progress of the application is further paused.

When progress of the application is paused, and when an angular displacement from the first threshold value is negative and the absolute value of the angular displacement is larger than a second threshold value, progress of the application is resumed.

In an aspect, operations of pausing and resuming an application in a virtual space can be performed through an operation by a movement of the head of a user being immersed in the virtual space. That is, with a simple movement of the head of the user being immersed in the virtual space, a predetermined operation of an application in the virtual space can be performed.

The foregoing and other objects, features, aspects and advantages of the present technical ideas will become more apparent from the following detailed disclosure when taken in conjunction with the accompanying drawings.

DESCRIPTION OF THE EMBODIMENTS

Figure 1A:
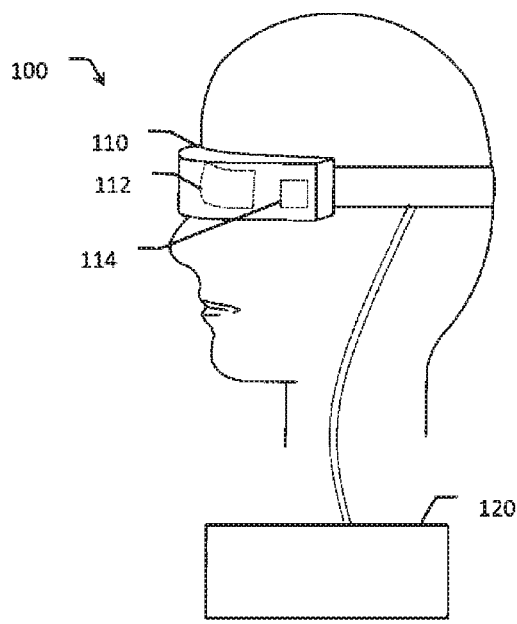
FIG. 1A is a schematic view of an HMD system 100 according to an embodiment.

Hereinafter, embodiments of the present technical ideas will be described with reference to the drawings. In the following description, the same parts have the same reference characters allotted. They are named and function in the same manner. Therefore, detailed description thereof will not be repeated.

Referring to FIG. 1A, a configuration of HMD system 100 according to an embodiment will be described. HMD system 100 includes an HMD 110 and a control device 120. HMD 110 and control device 120 are connected to be capable of making wired or wireless communications with each other. HMD 110 includes a display 112 and an angular velocity sensor 114.

Figure 1B:
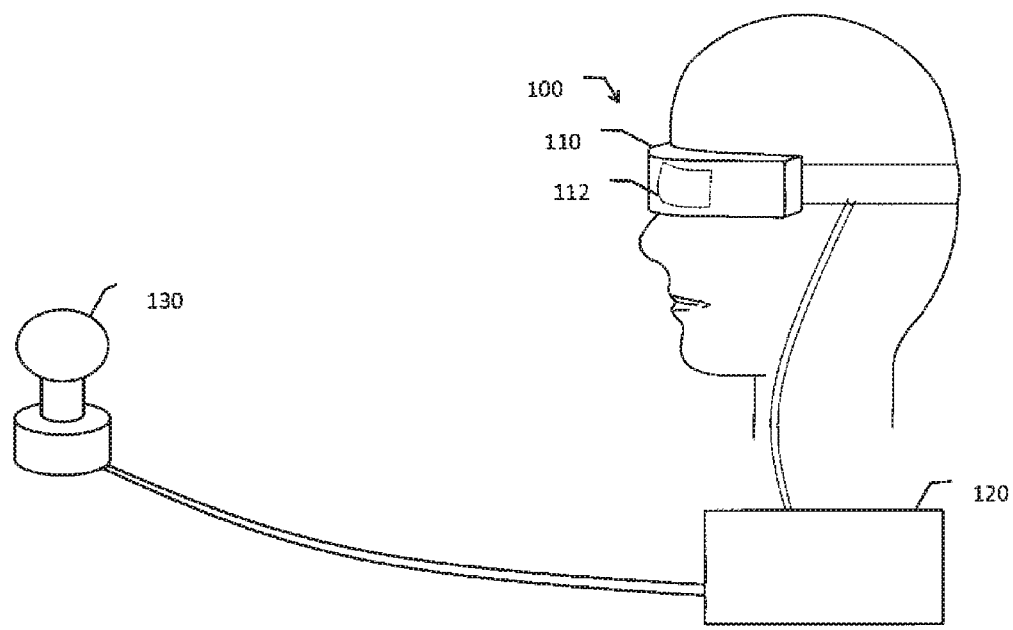
FIG. 1B is a schematic view of an HMD 110 according to an embodiment connected to an infrared sensor.
Figure 6:
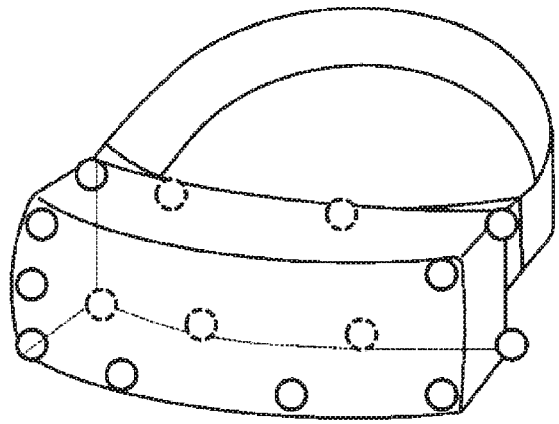
FIG. 6 shows a plurality of detection points virtually provided on an HMD and detected by an infrared sensor according to an embodiment.

FIG. 1B is a schematic view of HMD 110 according to another aspect of an embodiment. In FIG. 1B, an infrared sensor 130 is connected to control device 120 to be capable of making communications therewith. HMD 110 does not include angular velocity sensor 114 in FIG. 1B. As illustratively shown in FIG. 6, in correspondence to a user's movement, infrared sensor 130 may detect with time the position in a three-dimensional real space of a plurality of detection points virtually provided on HMD 110 for emitting infrared light. An inclination detector 210 can obtain time changes in angle about each axis in accordance with a movement of HMD 110 based on time changes in position in the three-dimensional real space of the plurality of detection points detected with time by infrared sensor 130.

Although not shown in FIGS. 1A and 1B, a controller of HMD 110 may be realized by a well-known smartphone or mobile terminal held by a user, for example. The controller can be connected to control device 120 to be capable of making communications therewith.

Figure 2:
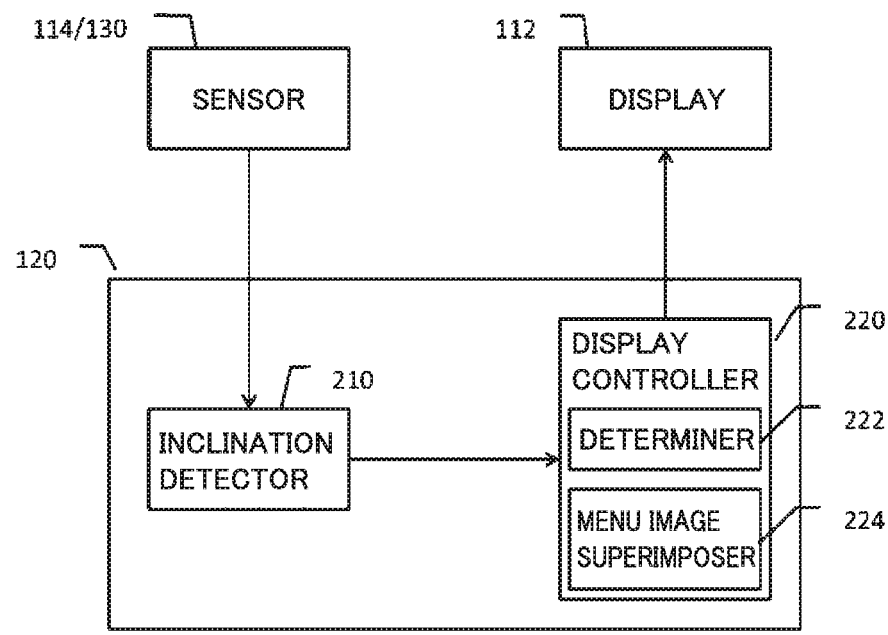
FIG. 2 shows a functional configuration for implementing display processing in HMD system 100 according to an embodiment.

FIG. 2 shows a functional configuration for implementing display processing in HMD system 100 according to one example of the present technique.

Figure 3A:
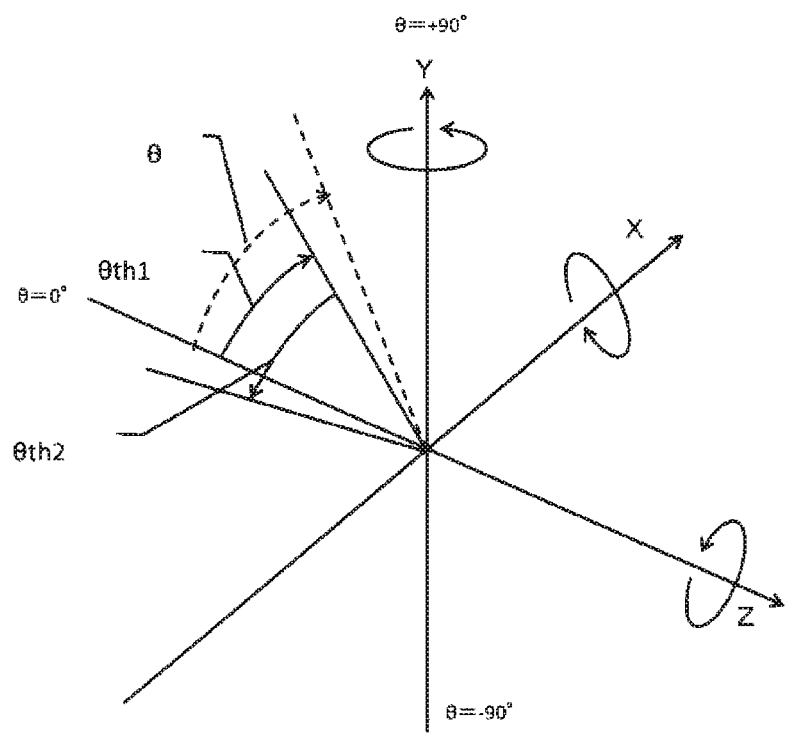
FIG. 3A shows a first threshold value $\theta th1$ and a second threshold value $\theta th2$ in an orthogonal coordinate system in a three-dimensional space according to an embodiment.
Figure 3B:
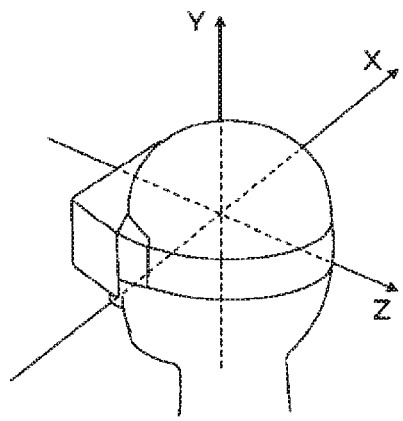
FIG. 3B shows a user wearing HMD 110 in the orthogonal coordinate system in the three-dimensional space according to an embodiment.

Inclination detector 210, based on an output from sensor 114/130, can detect an inclination of HMD 110 mounted on the user's head in each axial direction (a yaw angle indicating the rotation of the HMD about a Y-axis, a pitch angle indicating the rotation about an X-axis, and a roll angle indicating the rotation about a Z-axis, as shown in FIGS. 3A and 3B).

Figure 4A:
FIG. 4A shows a screen displayed on a display of HMD 110 according to an embodiment when a user views the horizontal direction.
Figure 4A:
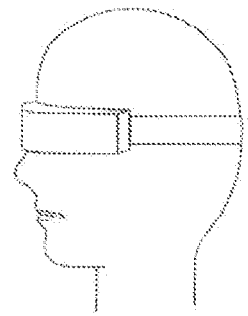

A display controller 220 generates an in-progress application image displayed on display 112 in accordance with the inclination of HMD 110 detected by the sensor, for example, the lateral inclination (what is called the yaw angle) with the Y-axis of HMD 110 serving as the rotation axis, and outputs the generated image to display 112. In this case, when a user turns 90° to the left, for example, display controller 220 generates a virtual space image present at 90° to the left of the user. In association with a movement of the head of a user wearing HMD 110 as shown in FIG. 4A, display controller 220 generates a virtual space image corresponding to the movement, and outputs the generated virtual space image to display 112.

An area where a menu image is to be displayed can be previously determined for each application. For example, when an application operated by a user is for manipulating the action of a game character on the horizontal plane in a three-dimensional space, the upper area in a virtual space which is not used during a game can be determined as an area where the menu image is displayed.

First threshold value $\theta th1$ can be previously determined for each application. For example, the pitch angle of HMD 110 usually transitioning by a user moving his/her head while operating an application is set at about ±10°. In this case, first threshold value $\theta th1$ is set at about +30°, for example. Accordingly, a user operation while operating an application can be clearly distinguished from an operation of intentionally turning to an area which is not used while the application is in progress in order to have a menu image displayed. A malfunction can be avoided by setting an angle larger than a usual operating range while operating an application by more than or equal to a certain angle (e.g., 20°). In the present embodiment, the threshold value is set using the pitch angle of HMD 110 since it is preferable that the area where a menu image is displayed be located in the upper area within a virtual space for the purpose of progress of an application. When it is preferable that the area where a menu image is displayed be located in a lateral area with respect to the Y-axis for the purpose of progress of an application, for example, the threshold value can be set using the yaw angle.

A determiner 222 determines whether or not one of detected inclinations of HMD 110 has exceeded second threshold value $\theta th2$ (FIG. 3A) in the direction opposite to the predetermined direction. When pitch angle $\theta$ exceeds second threshold value $\theta th2$ in the negative direction, for example, display controller 220 resumes progress of the application having been paused. Display controller 220 then outputs a virtual space image on which the menu image is not superimposed to display 112. Second threshold value $\theta th2$ has a magnitude more than or equal to first threshold value $\theta th1$, and an operation of changing an application image, namely, an operation of displaying or hiding a menu image can be prevented from being performed unintentionally. When a user faces upward over a certain time, he/she gets a stiff neck and may unintentionally take down his/her head gradually. Therefore, an inclination when a user wearing HMD 110 moves his/her neck downward for resuming an application can be made larger than the inclination when the user intentionally moves his/her neck upward to display a menu or pause an application.

According to the present disclosure, a user can perform a predetermined operation on an application, for example, a user can cause a menu image to be displayed, hidden or the like by a movement of his/her head without performing a button operation through use of a controller or an inconvenient adjustment of viewpoint/focal point. In particular, a user wearing HMD 110 and observing three-dimensional video needs to adjust the focus of eyes depending on the depth of the video. Furthermore, depending on the position where the menu image is to be displayed, the user has to perform inconvenient adjustment of viewpoint. For example, when display 112 displays the menu image at the upper part of an application screen currently displayed and being operated by a user, the user needs to observe the menu image displayed on the upper part of the screen by a movement of his/her eyeballs. However, it is difficult for a user to move his/her eyeballs and the user turns his/her entire head upward unintentionally. In the present disclosure, since progress of an application can be paused and further, a menu image can be displayed on display 112 by a user turning his/her head upward, the operability of HMD 110 may be improved.

The respective elements shown in FIG. 2 as a functional block for performing various types of processing may be realized as a combination of circuit elements for implementing the respective types of processing, or software for implementing the respective types of processing and a computer having hardware for executing processing of the software. Hardware may include a CPU, a memory and other integrated circuits. Software may include various types of programs loaded on the memory, and the like. Therefore, a person skilled in the art will understand that these functional blocks can be realized by hardware, software or the combination thereof.

FIG. 4A shows an image while an application is in progress in a three-dimensional virtual space virtually displayed on display 112 when a user wearing HMD 110 observes an area of about ±10°, for example, with respect to the horizontal direction which is an initial angle. FIG. 4A also shows an image in a three-dimensional virtual space virtually displayed when a user turns his/her head downward from a state shown in FIG. 4B with an inclination larger than second threshold value $\theta th2$ with the lateral direction in a real space serving as an axis. The area of about ±10° is a range of the pitch angle which transitions when a user moves his/her head while operating an application, as described above.

Figure 4B:
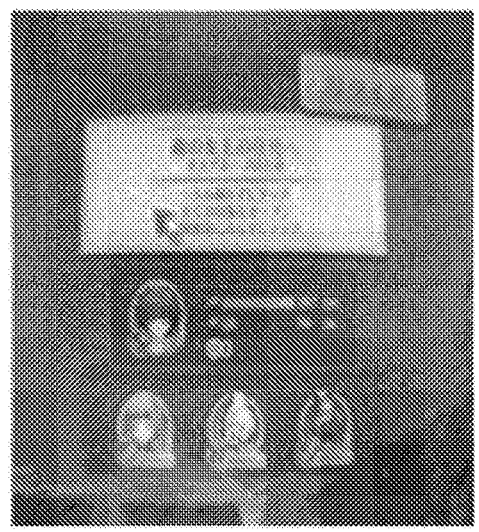
FIG. 4B shows a screen displayed on the display of HMD 110 according to an embodiment when a user views an upward direction.
Figure 4B:
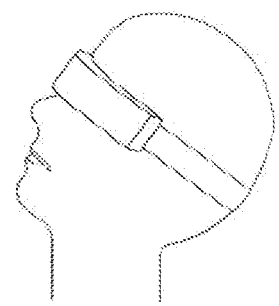

FIG. 4B shows an image in a virtual space on which a menu image is superimposed, virtually displayed when a user wearing HMD system 100 turns his/her head upward with an inclination larger than first threshold value θth1. In an embodiment, when a user views an upward direction, a menu image is superimposed in a floating manner on an image (an image of "sky" in FIG. 4B) displayed as a result of a change in an application image in association with the direction to which the user has turned. In FIG. 4B, four game characters used in an in-progress application are displayed on the menu image. The status of one of the four game characters is also displayed in detail. The user can select a menu displayed in a menu image, for example, "retirement" shown in FIG. 4B, using the controller connected to be capable of communicating with control device 120.

Figure 5:
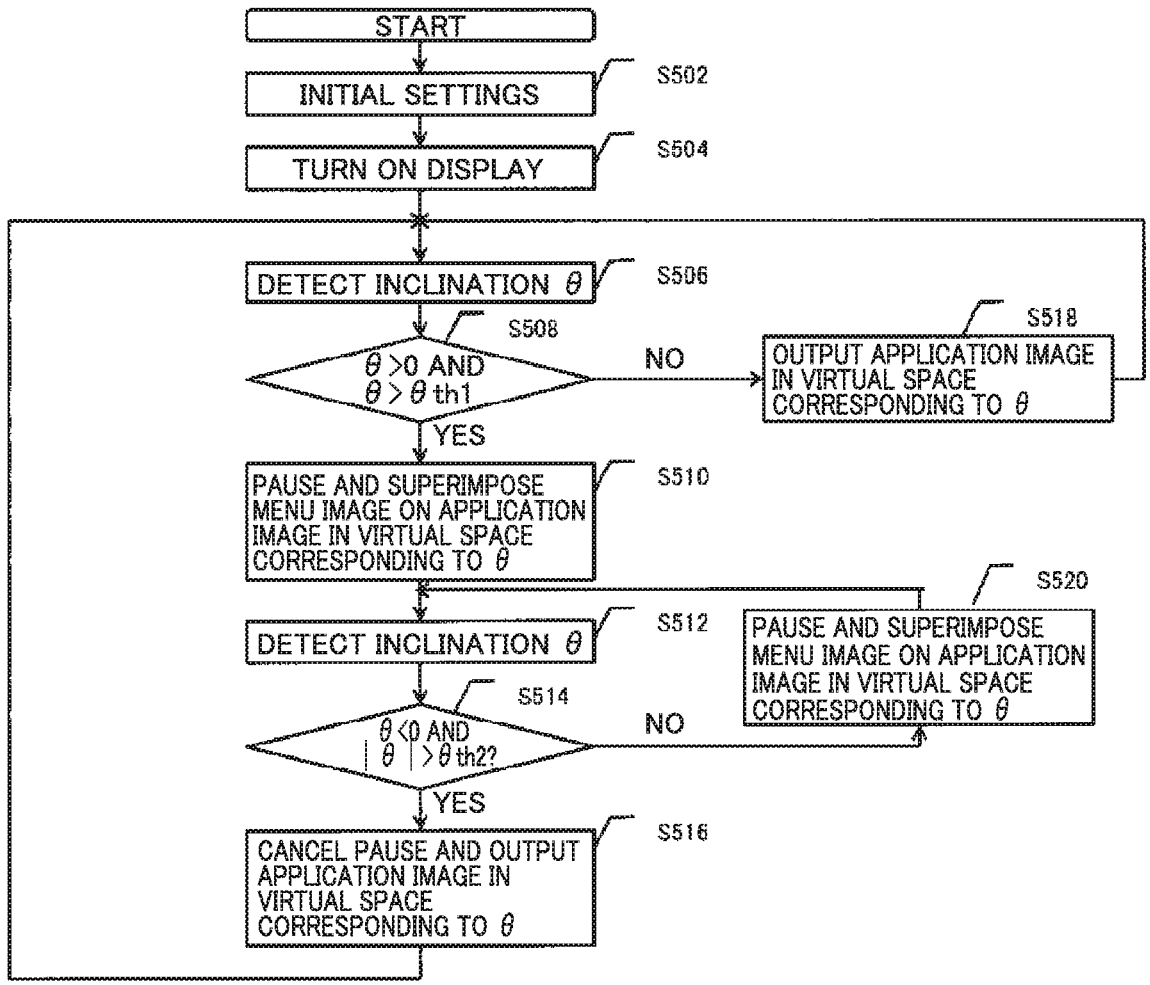
FIG. 5 shows a flow of a process for controlling the display in an HMD system according to an embodiment.

Next, referring to FIG. 5, a flow of a process of controlling the display of HMD system 100 will be described.

Since the angle detected by angular velocity sensor 114 is relative, control device 120 first makes initial settings on MID 110 mounted on the head of a user. Control device 120 sets, as an initial value, the pitch angle obtained from angular velocity sensor 114 while the user wearing HMD 110 is observing the horizontal direction (step S502). In the case of obtaining the angular velocity in each axial direction of HMD 110 by infrared sensor 130, however, control device 120 may not necessarily make initial settings since it is possible to detect the horizontal direction of HMD 110.

Furthermore, in step S502, control device 120 can initially set first threshold value θth1 and second threshold value θth2. To avoid a malfunction in an application operation by a user, first threshold value θth1 can be set to be less than or equal to second threshold value θth2.

Next, when an application is started/advanced by the user, display controller 220 causes display 112 of HMD 110 to display an application image (step S504). The user can thus observe a virtual space image displayed on display 112.

Next, inclination detector 210 detects with time the angular velocity about each axis based on the output of sensor 114/130 obtained in accordance with a movement of the user's head, and determines time changes in angle about each axis. Inclination detector 210 then detects a pitch angle θ which is a vertical inclination with the X-axis of the HMD shown in FIG. 3A serving as the rotation axis from the time changes in angle about each axis (step S506).

Next, determiner 222 of display controller 220 determines whether or not detected vertical inclination θ (what is called a pitch angle) of the HMD with the lateral direction serving as the axis is positive and larger than first threshold value θth1 (step S508). When θ is positive and larger than first threshold value θth1, display controller 220 pauses progress of the application, and generates a composite image in which a menu image is superimposed on the application image in the virtual space corresponding to θ. Display controller 220 then outputs the generated composite image to display 112 (step S510). For example, when the user wearing HMD 110 moves his/her head to observe upward with an inclination larger than first threshold value θth1, the user can cause control device 120 to pause the application, and can observe the composite image in which the menu image is superimposed on the application image in the virtual space corresponding to inclination θ. In this way, the user can pause an application by a movement of his/her head, and can cause the menu image to be displayed.

Next, inclination detector 210 detects with time the angular velocity about each axis based on the output of sensor 114/130 obtained in accordance with a movement of the user's head, and determines time changes in angle about each axis. Inclination detector 210 then detects inclination θ with the X-axis of the MID shown in FIG. 3A serving as the rotation axis from the time changes in angle about each axis (step S512).

Next, determiner 222 of display controller 220 determines whether or not detected inclination θ is negative and the absolute value of θ is larger than second threshold value θth2 (step S514). When θ is negative and the absolute value of θ is larger than second threshold value θth2 (YES in step S514), display controller 220 cancels the pause of the application, and resumes progress of the application. Furthermore, display controller 220 deletes the menu image from the application image, and outputs the application image in the virtual space corresponding to detected inclination θ to display 112 (step S516) to return the control to step S506.

On the other hand, when "NO" in steps S508 and 514, display controller 220 continues the pause of the application. Display controller 220 then continues outputting the generated composite image on which the menu image is superimposed, to display 112 (step S520). For example, even if the user wearing HMD 110 moves his/her head within a range not exceeding the second threshold value to observe predetermined direction θ, the pause of progress of the application is continued, and the user can observe the composite image in which the menu image is superimposed on the application image in the virtual space corresponding to this inclination θ. The pause can be cancelled and the user can return to the in-progress application only after it is detected that inclination θ is negative and larger than second threshold value θth2. Then, the control returns to step S512.

The present embodiment describes HMD system 100 for performing an application operation by a movement of the head of a user, as well as the program and method for causing HMD 110 to display a virtual space image. In particular, the present embodiment describes the system, program and method for performing an operation of switching between displaying and hiding of a menu image on an application image displayed on HMD 110 and an operation of switching between pause and resumption of an application by a movement of the head of a user wearing HMD 110. Furthermore, in another embodiment, a movement of the head of a user wearing HMD 110 can be associated with another predetermined operation which requires a check when an application proceeds. For example, the user can perform an operation of switching between an in-progress application image and an image showing the status of another player joining the game by a movement of his/her head. Furthermore, in another embodiment, control device 120 can also obtain a plurality of movements of the head of a user wearing MID 110, and can associate the obtained movements with a plurality of other predetermined operations which require checks when an application proceeds. For example, control device 120 can associate the pitch and yaw angles of a movement of the head of a user wearing HMD 110 respectively with a plurality of predetermined operations necessary for progress of the application having been conventionally performed by the controller.

According to one embodiment, a head-mounted display system is provided for displaying an image in a virtual space. The system comprises: an inclination detector for detecting an inclination from an initial angle of a head-mounted display mounted on a user while an application is in progress; and a display controller for generating an application image in progress in the virtual space in accordance with the detected inclination and outputting the application image to the head-mounted display. When the detected inclination is larger than a first threshold value, the display controller generating an image in which a menu image is superimposed on the application image generated in accordance with the inclination and outputting the generated image to the head-mounted display. When the detected inclination is larger than the first threshold value, the display controller further pausing progress of the application. When progress of the application is paused, and when an angular displacement from the first threshold value is negative and the absolute value of the angular displacement is larger than a second threshold value, the display controller resuming progress of the application.

According to one aspect, the detected inclination is a pitch angle of the head-mounted display.

According to one aspect, the first threshold value is less than or equal to the second threshold value.

In accordance with an embodiment, a non-transitory computer-readable data recording medium is provided. The medium stores a computer-implemented program for displaying an image in a virtual space on a head-mounted display, the program, when executed by a computer, causes the computer to:

detect an inclination from an initial angle of the head-mounted display mounted on a user while an application is in progress; and generate an application image in progress in the virtual space in accordance with the detected inclination and output the application image to the head-mounted display, outputting the application image to the head-mounted display including:
when the detected inclination is larger than a first threshold value, generating an image in which a menu image is superimposed on the application image generated in accordance with the inclination and outputting the generated image to the head-mounted display; and
when the menu image is output to the head-mounted display, and when an angular displacement from the first threshold value is negative and the absolute value of the angular displacement is larger than a second threshold value, generating an application image in which the menu image is not superimposed on the virtual space in accordance with the inclination and outputting the generated application image to the head-mounted display.

According to one aspect, the inclination is a pitch angle of the head-mounted display.

According to one aspect, the first threshold value is less than or equal to the second threshold value.

In accordance with an embodiment, a non-transitory computer-readable data recording medium is provided. The medium stores a computer-implemented program for displaying an image in a virtual space on a head-mounted display, the program, when executed by a computer, causes the computer to:

detect an inclination from an initial angle of the head-mounted display mounted on a user while an application is in progress; and generate an application image in progress in the virtual space in accordance with the detected inclination and output the application image to the head-mounted display, outputting the application image to the head-mounted display including:
when the detected inclination is larger than a first threshold value, generating an image in which a menu image is superimposed on the application image generated in accordance with the inclination and outputting the generated image to the head-mounted display;
when the detected inclination is larger than the first threshold value, further pausing progress of the application; and
when progress of the application is paused, and when an angular displacement from the first threshold value is negative and the absolute value of the angular displacement is larger than a second threshold value, resuming progress of the application.

According to one aspect, the inclination is a pitch angle of the head-mounted display.

According to one aspect, the first threshold value is less than or equal to the second threshold value.

Although the present technical ideas have been described and illustrated in detail, it is clearly understood that the same is by way of illustration and example only and is not to be taken by way of limitation, the scope of the present technical ideas being interpreted by the terms of the appended claims.

What is claimed is:

1. A head-mounted display system comprising:
an inclination detector for detecting an inclination of a head-mounted display;
a display controller for generating an application image in accordance with the detected inclination for display on the head-mounted display, wherein the display controller is configured to:
superimpose a menu image on the application image for display on the head-mounted display in response to a determination that the detected inclination exceeding a first threshold value; and
a controller configured to communicate with the display controller, wherein the controller is usable to navigate the menu image.

2. The head-mounted display system according to claim 1, wherein the display controller is further configured to remove the menu image from the application image in response to a determination that (i) an angular displacement of the detected inclination from the first threshold value is negative and (ii) a magnitude of the angular displacement exceeds a second threshold value.

3. The head-mounted display system according to claim 1, wherein the inclination detector is configured to detect a pitch angle of the head-mounted display.

4. The head-mounted display system according to claim 1, wherein the inclination detector is configured to detect a yaw angle of the head-mounted display.

5. The head-mounted display system according to claim 1, wherein the display controller is further configured to pause the application image in response to the determination that the detected inclination exceeding a first threshold value.

6. The head-mounted display system according to claim 1, wherein the first threshold is greater than or equal to about 20-degrees.

7. A method comprising:
detecting an inclination from an initial angle of a head-mounted display;
displaying an application image on the head-mounted display in accordance with the detected inclination;
superimposing a menu image on the application image displayed by the head-mounted display in response to a determination that the detected inclination exceeds the first threshold value; and navigating the menu image using a controller configured to communicate with a control device, wherein the control device is configured to control the head-mounted display.

8. The method according to claim 7, further comprising removing the menu image from the application image on the head-mounted display in response to a determination that (i) an angular displacement of the detected inclination from the first threshold value is negative and (ii) that a magnitude of the angular displacement exceeds a second threshold value.

9. The method according to claim 7, wherein the detecting of the inclination comprises detecting a pitch angle of the head-mounted display.

10. The method according to claim 7, wherein the detecting of the inclination comprises detecting a yaw angle of the head-mounted display.

11. The method according to claim 7, further comprising pausing the application image in response to the determination that the detected inclination exceeds the first threshold.

12. The method according to claim 11, further comprising:
changing, after the pausing, the application image in response to a determination that (i) an angular displacement of the detected inclination from the first threshold value is negative and (ii) that a magnitude of the angular displacement exceeds a second threshold value.

13. The method according to claim 7, further comprising selecting an item of the menu image in response to a signal from a user.

14. A method comprising:
detecting an inclination from an initial angle of a head-mounted display in a first angular direction;
displaying an application image on the head-mounted display in accordance with the detected inclination in the first angular direction;
superimposing a menu image on the application image displayed by the head-mounted display in response to a determination that the detected inclination in the first angular direction exceeds the first threshold value;
pausing the application image in response to the determination that the detected inclination in the first angular direction exceeds the first threshold value;
detecting, following the pausing, an inclination of the head-mounted display in a second angular direction opposite the first angular direction; and
resuming the application image in response to a determination that a magnitude of the detected inclination in the second angular direction is greater than a second threshold.

15. The method according to claim 14, wherein the detecting of the inclination in the first angular direction comprises detecting a pitch angle of the head-mounted display.

16. The method according to claim 14, wherein the detecting of the inclination in the first angular direction comprises detecting a yaw angle of the head-mounted display.

17. The method according to claim 14, further comprising removing the menu image from the application image in response to the determination that the magnitude of the detected inclination in the second angular direction is greater than the second threshold.

18. The method according to claim 14, wherein the first threshold is greater than or equal to about 20-degrees.

19. The method according to claim 14, further comprising selecting an item of the menu image in response to a signal from a user.

* * * * *